(12) United States Patent
Okamoto

(10) Patent No.: US 11,591,488 B2
(45) Date of Patent: Feb. 28, 2023

(54) ROSIN-MODIFIED PHENOL RESIN, LITHOGRAPHIC PRINTING INK, AND PRINTED PRODUCT

(71) Applicants: TOYO INK SC HOLDINGS CO., LTD., Tokyo (JP); TOYO INK CO., LTD., Tokyo (JP)

(72) Inventor: Kazuya Okamoto, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 17/596,604

(22) PCT Filed: May 18, 2021

(86) PCT No.: PCT/JP2021/018811
§ 371 (c)(1),
(2) Date: Dec. 14, 2021

(87) PCT Pub. No.: WO2022/064765
PCT Pub. Date: Mar. 31, 2022

(65) Prior Publication Data
US 2022/0267625 A1  Aug. 25, 2022

(30) Foreign Application Priority Data

Sep. 25, 2020 (JP) .............................. JP2020-160953
Apr. 21, 2021 (JP) .............................. JP2021-071713

(51) Int. Cl.
*C09D 11/103* (2014.01)
*C08G 8/34* (2006.01)
*C09D 161/14* (2006.01)

(52) U.S. Cl.
CPC .............. *C09D 11/103* (2013.01); *C08G 8/34* (2013.01); *C09D 161/14* (2013.01)

(58) Field of Classification Search
CPC ....................................................... C08G 8/34
See application file for complete search history.

(56) References Cited

U.S. PATENT DOCUMENTS

| | | | | |
|---|---|---|---|---|
| 2,241,422 | A | * 5/1941 | Rosenblum | .............. C08G 8/30 527/603 |
| 2004/0181026 | A1 | 9/2004 | Toyoda et al. | |
| 2004/0210029 | A1 | 10/2004 | Fontana | |
| 2008/0207863 | A1 | 8/2008 | Fontana | |

FOREIGN PATENT DOCUMENTS

| | | | |
|---|---|---|---|
| EP | 1 454 932 A1 | 9/2004 | |
| GB | 468681 | * 7/1937 | |
| JP | 05-279612 A | 10/1993 | |
| JP | 09-169953 A | 6/1997 | |
| JP | 2003-313482 A | 11/2003 | |
| JP | 2004-269752 A | 9/2004 | |
| JP | 2006-520418 A | 9/2006 | |
| JP | 2007-169574 A | 7/2007 | |
| JP | 2014-181313 A | 9/2014 | |
| JP | 2015-193790 A | 11/2015 | |
| JP | 2018-159013 A | 10/2018 | |
| JP | 6874898 B1 | 5/2021 | |
| KR | 2018001872 A | * 1/2018 | ........... B60C 1/0016 |
| WO | 2016/208375 A1 | 12/2016 | |

OTHER PUBLICATIONS

Machine Translation of KR20180001872A. Jan. 5, 2018. (Year: 2018).*
Extended European Search Report dated Jun. 21, 2022 European Application No. 21819706.9.
International Search Report for PCT/JP2021/018811, dated Jul. 20, 2021.

* cited by examiner

*Primary Examiner* — Stephen E Rieth
(74) *Attorney, Agent, or Firm* — Sughrue Mion, PLLC

(57) ABSTRACT

A rosin-modified phenol resin (A) is a reaction product of a rosin (b), a phenol (c), a formaldehyde (d) and a polyol (e), wherein the rosin (b) contains 0.1 to 3.5% by mass of a monoterpene (a1) and a sesquiterpene (a2) relative to the total weight of the rosin, and Mw/Mn which is the ratio of the weight average molecular weight (Mw) and the number average molecular weight (Mn) is 10 to 60.

5 Claims, No Drawings

ROSIN-MODIFIED PHENOL RESIN, LITHOGRAPHIC PRINTING INK, AND PRINTED PRODUCT

CROSS REFERENCE TO RELATED APPLICATIONS

This application is a National Stage of International Application No. PCT/JP2021/018811 filed May 18, 2021, claiming priority based on Japanese Patent Application No. 2020-160953 filed Sep. 25, 2020 and Japanese Patent Application No. 2021-071713 filed Apr. 21, 2021.

TECHNICAL FIELD

One embodiment of the present invention relates to a resin constituting a lithographic printing ink (hereinafter, abbreviated to as the "ink") used in printed material such as books, flyers, catalogs and newspapers. One embodiment of the present invention relates to, specifically, a resin for a lithographic printing ink which improves the fluidity of the ink, has low soiling and blanket residue, and can obtain a printed material having a high glossiness.

BACKGROUND ART

The lithographic printing ink is an ink having a high relative viscosity of 5 to 100 Pa·s. In the mechanism of a lithographic printing machine, ink is supplied from an ink fountain of a printing machine via a plurality of rollers to an image area on a plate surface, and dampening water is supplied to the non-image area of the plate surface. Furthermore, an image formed on the plate surface is transferred to a blanket, and is then transferred to the paper.

In recent years, there has been an increasing demand for personnel saving, labor saving, automation, and high speed at the time of printing. Further, the technology which can print on a wide range of paper from coated paper to non-coated paper has been demanded. Moreover, there is a desire for an ink by which a high quality printed matter can be stably obtained over a long period of time without the generation of soiling under various printing conditions. Specifically, there is a strong desire for an ink which has a good fluidity of the ink, an excellent gloss on the printed material, and which can reduce printing troubles such as blanket residue. Blanket residue means that a mixture of the ink and paper powder is deposited at the boundary of the image area of the blanket and the non-image area during printing, and a large deposition amount of the mixture causes poor image formation.

Conventionally, in order to improve the gloss of a printed material, a method which reduces the viscosity of the ink by increasing the blending amount of petroleum-based solvent or vegetable oil and the like to improve the smoothness of the print surface, and a method which uses a low molecular weight highly soluble resin or a petroleum resin and the like to increase the resin component in the ink system in order to strongly control the penetration of ink into the printing paper substrate to maintain the ink coating film thickness, and the like have been used.

However, when increasing the blending amount of the petroleum-based solvent or the vegetable oil in order to reduce the ink viscosity, the tack value of the ink tends to decrease, and the transfer between rollers on the printing machine deteriorates. Further, when using the low molecular weight highly soluble resin or the petroleum resin or the like to increase the resin component in the ink system, the tack value of the ink tends to increase too much which causes paper peeling, or the control of emulsification becomes difficult which interferes with the printability of the ink. Therefore, improving the gloss of a printed material while maintaining the printability was limited.

Other than the methods, there is also a method which uses a petroleum-based solvent having a high solubility with respect to the resin component in the ink system to increase the compatibility in the ink system so as to ensure a low ink viscosity and a high concentration of the resin component. However, the gloss effect cannot be sufficiently obtained due to the solubility of the petroleum-based solvent in the resin. Further, many petroleum-based solvents having a high solubility in the resin component are mainly composed of aromatic hydrocarbons which have adverse effects on the human body. Petroleum-based solvents during printing are a cause of environmental load such as the printing work environment and atmospheric pollution, thus, recently the usage thereof has been suspended.

Further, offset ink compositions having excellent gloss and prepared using fatty acid esters as ink components have been disclosed (Patent Documents 1 and 2). However, with these ink composition, it is difficult to control the penetration of fatty acid ester into the paper, and the situation is such that the paper which can be used during printing is limited, and the dryness of the ink is not sufficiently satisfactory.

Improvements have been made in regards to the rosin-modified phenol resin used as an ink component. Patent Document 3 discloses a method for reacting a monoester obtained by partially esterifying a mixture of a rosin and an animal or vegetable oil fatty acid with a monoalcohol with a polyhydric alcohol and a phenol formaldehyde initial condensate. However, with this method, in order to use a monoalcohol for esterification, there can be no cross-linking with the rosin and the animal or vegetable oil fatty acid, which makes it difficult to control the molecular weight.

Patent Document 4 discloses a rosin-modified phenol resin obtained by reacting a cyclic terpenyl phenol. However, a high cost is necessary in order to obtain the cyclic terpenyl phenol by the reaction or extraction. Furthermore, Patent Document 4 does not disclose the suppression of soiling and the behavior on the printing machine which are required in the market, and does not provide an ink which is desired in the market.

Patent Document 5 discloses a resin metallic salt obtained by performing a neutralization reaction of an α,β-unsaturated carboxylic acid adduct of a rosin reduced in the low boiling components to 2% or less with two or more metallic compounds. However, since this is a resin for gravure printing and not for printing via a blanket, it does not solve the problem with lithographic printing. Further, it is not possible for the resin metallic salt to obtain the viscosity and elasticity necessary for a lithographic ink, and thus, is not suitable as a resin for a lithographic printing ink. Furthermore, in Patent Document 5, the resin is heated at 250° C. to 300° C. in order to reduce the low boiling components in the α,β-unsaturated carboxylic acid adduct of a rosin to 2% or less. However, when heated to such a temperature, the resin acid in the rosin changes to a less reactive dehydroabietic acid, and the reactivity at the time of resin preparation cannot be ensured.

PRIOR ART DOCUMENTS

Patent Documents

Patent Document 1: JP 2003-313482 A
Patent Document 2: JP 2007-169574 A

Patent Document 3: JP 2004-269752 A
Patent Document 4: JP 2015-193790 A
Patent Document 5: JP 9-169953 A

SUMMARY OF THE INVENTION

Problems Invention Aims to Solve

One embodiment of the present invention intends to provide a resin for a lithographic printing ink for obtaining a lithographic printing ink having an excellent fluidity of the ink, and capable of obtaining a high gloss printed material with little soiling and blanket residue during printing for a long period of time.

Means for Solution of the Problems

As a result of intensive investigations in order to solve the problems, the present inventors discovered that the lithographic printing ink comprising a specific rosin-modified phenol resin (A) has an excellent fluidity of the ink, and is capable of obtaining a high gloss printed material with little soiling and blanket residue during printing for a long period of time, and were therefore able to complete the present invention. Namely, the embodiments of the present invention related to the following. However, the present invention is not limited to the embodiments disclosed below, and various modifications are possible without departing from the scope of the present invention.

One embodiment relates to a rosin-modified phenol resin (A) which can be suitably used in a resin for a lithographic printing ink.

In one embodiment, the rosin-modified phenol resin (A) is a reaction product of a rosin (b), a phenol (c), a formaldehyde (d), and a polyol (e), wherein the rosin (b) contains 0.1 to 3.5% by mass of a monoterpene (a1) and a sesquiterpene (a2) relative to the total weight of the rosin (b), and Mw/Mn which is the ratio of the weight average molecular weight (Mw) and the number average molecular weight (Mn) is 10 to 60.

In one embodiment, the rosin (b) preferably comprises 20 to 80% by mass of a cyclic diterpene having a conjugated double bond.

In one embodiment, the rosin-modified phenol resin (A) is preferably the reaction product of 30 to 85% by mass of the rosin (b), 5 to 50% by mass of the phenol (c), 3 to 20% by mass of the formaldehyde (d) and 3 to 20% by mass of the polyol (e) based on the total mass of the rosin-modified phenol resin raw material.

In one embodiment, the rosin-modified phenol resin (A) preferably has a weight average molecular weight of 4,000 to 120,000, and, an acid value of 5 to 50 mgKOH/g.

Another embodiment relates to the rosin-modified phenol resin (A) which is a reaction product of the rosin (b), a resol-type phenolic resin (Rc) and the polyol (e), wherein the rosin (b) contains 0.1 to 3.5% by mass of the monoterpene (a1) and the sesquiterpene (a2) relative to the total weight of the rosin (b), the hydroxyl value of this resol-type phenolic resin (Rc) is 15 to 40 mgKOH/g, and Mw/Mn which is the ratio of the weight average molecular weight (Mw) and the number average molecular weight (Mn) is 10 to 60.

In one embodiment, the rosin-modified phenol resin (A) preferably has a weight average molecular weight of 7,000 to 120,000, and, an acid value of 5 to 50 mgKOH/g.

In one embodiment, the rosin-modified phenol resin (A) is preferably the reaction product of 30 to 85% by mass of the rosin (b), 7 to 67% by mass of the resol-type phenolic resin (Rc), and 3 to 20% by mass of the polyol (e) based on the total mass of the rosin-modified phenol resin raw material.

Another embodiment relates to a lithographic printing ink comprising the rosin-modified phenol resin (A) of the aforementioned embodiment.

Another embodiment relates to a substrate and a printed material obtained by printing the lithographic printing ink of the aforementioned embodiment on the substrate.

Another embodiment relates to a production method of a rosin-modified phenol resin (A) comprising the steps of:

conducting a reaction of a rosin (b), a phenol (c) and a formaldehyde (d); and conducting a reaction of the compound obtained by the step and a polyol (e), wherein the rosin (b) contains 0.1 to 3.5% by mass of a monoterpene (a1) and a sesquiterpene (a2) relative to the total weight of the rosin (b), and Mw/Mn which is the ratio of the weight average molecular weight (Mw) and the number average molecular weight (Mn) is 10 to 60.

Another embodiment relates to a production method of the rosin-modified phenol resin (A), comprising conducting a reaction of the rosin (b), the phenol (c), the formaldehyde (d) and the polyol (e), the rosin (b) contains 0.1 to 3.5% by mass of a monoterpene (a1) and a sesquiterpene (a2) relative to the total weight of the rosin (b), and Mw/Mn which is the ratio of the weight average molecular weight (Mw) and the number average molecular weight (Mn) is 10 to 60.

Another embodiment relates to a production method of the rosin-modified phenol resin (A), comprising conducting a reaction of the rosin (b), a resol-type phenolic resin (Rc) and the polyol (e), wherein the rosin (b) contains 0.1 to 3.5% by mass of a monoterpene (a1) and a sesquiterpene (a2) relative to the total weight of the rosin (b), and the Mw/Mn which is the ratio of the weight average molecular weight (Mw) and the number average molecular weight (Mn) is 10 to 60.

In one embodiment, the hydroxyl value of this resol-type phenolic resin (Rc) is preferably 15 to 40 mgKOH/g.

The disclosure of the present description is related to the subject matter disclosed in prior Japanese Application 2020-160953 filed on Sep. 25, 2020 and prior Japanese Application 2021-071713 filed on Apr. 21, 2021, the entire contents of which are incorporated by reference herein.

Effects of the Invention

By using the rosin-modified phenol resin (A) which is one embodiment of the present invention as a resin for a lithographic printing ink, a lithographic printing ink can be provided which has an excellent fluidity of the ink, and is capable of obtaining a high gloss printed material with little soiling and blanket residue during printing for a long period of time.

EMBODIMENTS FOR CARRYING OUT THE INVENTION

Terpenes such as monoterpenes and sesquiterpenes are biological substances produced by plants, insects, and fungi.

Rosins which are a raw material of rosin-modified phenol resins which are used as a resin for a lithographic printing ink which is an embodiment of the present invention may comprise the terpenes.

In one embodiment, a rosin (b) to be used as a raw material of a rosin-modified phenol resin (A) is characterized wherein the sum of the content of a monoterpene (a1) and a sesquiterpene (a2) is 0.1 to 3.5% by mass based on the total weight of the rosin (b).

The rosin (b) was obtained by distilling raw pine tar, and the distillation temperature is preferably 200° C. or less. If the distillation temperature is 200° C. or more, isomerization of the diterpenes in the rosin tends to progress, and the reactivity during resin synthesis decreases.

When a rosin (b) having the sum of the content of the monoterpene (a1) and the sesquiterpene (a2) of 0.1 to 3.5% by mass is used as the raw material of the rosin-modified phenol resin (A), the compatibility with the ink components tends to increase, as does the gloss of the printed material which used the ink. However, if a rosin in which the sum of the content of the monoterpene (a1) and the sesquiterpene (a2) exceeding 3.5% by mass is used, the viscoelasticity and pigment dispersibility which are necessary in the ink tend to decrease, and problems such as the occurrence of soiling during printing, and insufficient fluidity of the ink are likely to occur. The sum of the content of the monoterpene (a1) and the sesquiterpene (a2) is preferably 0.5 to 3.0% by mass.

In one embodiment, the rosin (b) to be used is such that the um of the content of the monoterpene (a1) and the sesquiterpene (a2) may be 0.1 to 3.5% by mass relative to the total amount of rosins, and can be used without any specific limitations. For example, gum rosin, wood rosin, tall oil rosin, a polymerized rosin derived from a rosin, a stabilized rosin obtained by disproportionating or hydrogenating a natural rosin or a polymerized rosin, and an unsaturated acid-modified rosin obtained by adding an unsaturated carboxylic acid to a natural rosin or a polymerized rosin and the like can be used. Examples of the unsaturated acid-modified rosin include maleic acid-modified rosin, maleic anhydride-modified rosin, fumaric acid-modified rosin, itaconic acid-modified rosin, crotonic acid-modified rosin, silicic acid-modified rosin, acrylic acid-modified rosin, and methacrylic acid-modified rosin, and the like, or the acid-modified polymerized rosins corresponding to these. These rosins may be used alone or two or more may be combined.

The monoterpene (a1) is not specifically limited, and examples thereof include α-pinene, β-pinene, camphene, α-phellandrene, β-phellandrene, α-myrcene, β-myrcene, carene, limonene, γ-terpinene, α-terpinene, α-terpineol, β-terpineol, γ-terpineol and the like.

The sesquiterpene (a2) is not specifically limited, and examples thereof include α-cedrene, β-cedrene, α-copaene, β-copaene, isolongifolene, longifolene, caryophyllene, β-humulene, α-famesene, β-famesene, β-caryophyllene, α-guaiene, β-guaiene, γ-guaiene, α-elemene, β-elemene, γ-elemene, δ-elemene, α-bisabolene, β-bisabolene, γ-bisabolene, aromadendrin, cedrol and the like.

The content of the monoterpene (a1) and the sesquiterpene (a2) in the rosin (b) can be determined by the peak area ratio in a gas chromatography. Specifically, the content can be determined by the ratio (%) of the peak area corresponding to (a1) and (a2) relative to 100% of the total peak area of the rosin (b). Note that, the sum of the content of the monoterpene (a1) and the sesquiterpene (a2) in the rosin (b) may be 0.1 to 3.5% by mass relative to the total amount of the rosin, and the rosin may comprise only one of the monoterpene (a1) or the sesquiterpene (a2).

Further, in the case of the rosin in which the content of the monoterpene (a1) and the sesquiterpene (a2) is more than 3.5% by mass, it is possible to adjust the content of the monoterpene (a1) and the sesquiterpene (a2) to 0.1 to 3.5% by mass by purifying and thus, use as the rosin (b). Examples of the purification method include known methods such as a distillation method.

Further, in the case of a rosin in which the content of the monoterpene (a1) and the sesquiterpene (a2) is less than 0.1% by mass, the monoterpene (a1) and/or the sesquiterpene (a2) can be added and the content of the monoterpene (a1) and the sesquiterpene (a2) adjusted to 0.1 to 3.5% by mass so as to be useable as the rosin (b).

Rosins such as gum rosin, wood rosin and tall oil rosin comprise a plurality of diterpenic acids. In one embodiment of the present invention, the content of the cyclic diterpene having a conjugated double bond in the rosin is preferably 20 to 80% by mass. When this kind of rosin is used, it is possible to obtain a resin having a higher elasticity, and the blanket residue can be easily decreased.

The content of the cyclic diterpene having a conjugated double bond can be determined by the peak area of the gas chromatography. This can be determined by the ratio (%) of the peak area of the cyclic diterpene having a conjugated double bond relative to 100% of the total peak area of the rosin (b). Examples of the cyclic diterpene having a conjugated double bond include abietic acid, neoabietic acid, palustolic acid and levopimaric acid.

All aromatic compounds having a phenolic hydroxyl group may be used as the phenol (c) which can be used as a raw material of the rosin-modified phenol resin (A). Examples thereof include carbolic acid, cresol, p-amylphenol, bisphenol A, p-butylphenol, p-octylphenol, p-nonylphenol, p-dodecylphenol and the like. These phenols may be used alone or two or more may be combined.

The formaldehyde (d) which can be used as a raw material of the rosin-modified phenol resin (A) may be a formaldehyde aqueous solution, and examples include formalin, paraformaldehyde and the like.

The polyol (e) which can be used as a raw material of the rosin-modified phenol resin (A) may be a compound having 2 or more hydroxyl groups in the molecule, and examples include dihydric or trihydric or more alcohols.

Examples of a linear alkylene dihydric alcohol include 1,2-ethanediol, 1,2-propanediol, 1,3-propanediol, 1,2-butanediol, 1,4-butanediol, 1,2-pentanediol, 1,5-pentanediol, 1,6-hexanediol, 1,2-hexanediol, 1,5-hexanediol, 2,5-hexanediol, 1,7-heptanediol, 1,8-octanediol, 1,2-octanediol, 1,9-nonanediol, 1,2-decanediol, 1,10-decanediol, 1,12-dodecanediol, 1,2-dodecanediol, 1,14-tetradecanediol, 1,2-tetradecanediol, 1,16-hexadecanediol, and 1,2-hexadecanediol and the like.

Further, examples of a branched alkylene dihydric alcohol include 2-methyl-2,4-pentanediol, 3-methyl-1,5-pentanediol, 2-methyl-2-propyl-1,3-propanediol, 2,4-dimethyl-2,4-pentanediol, 2,2-dimethyl-1,3-propanediol, 2,2,4-trimethyl-1,3-pentanediol, dimethyloloctane, 2-ethyl-1,3-hexanediol, 2,5-dimethyl-2,5-hexanediol, 2-methyl-1,8-octanediol, 2-butyl-2-ethyl-1,3-propanediol, and 2,4-diethyl-1,5-pentanediol and the like.

Further, examples of a cyclic alkylene dihydric alcohol include 1,2-cyclohexanediol, 1,4-cyclohexanediol, 1,4-cyclohexanedimethanol, 1,2-cycloheptanediol, tricyclodecanedimethanol, hydrogenated catechol, hydrogenated resorcin, hydrogenated hydroquinone and the like.

Furthermore, polyether polyols such as polyethylene glycol (n=2 to 20), polypropylene glycol (n=2 to 20) and polytetramethylene glycol (n=2 to 20), polyester polyols and the like may be provided.

Further, examples of a trihydric or more alcohols include glycerol, trimethylolpropane, pentaerythritol, 1,2,6-hexanetriol, 3-methylpentane-1,3,5-triol, hydroxymethylhexanediol, trimethyloctane, diglycerol, ditrimethylolpropane, dipentaerythritol, sorbitol, inositol, tripentaerythritol and the like.

In one embodiment, the raw materials of the rosin-modified phenol resin (A) are preferably, on a mass basis, 30 to 85% by mass of the rosin (b), 5 to 50% by mass of the phenol (c), 3 to 20% by mass of the formaldehyde (d) and 3 to 20% by mass of the polyol (e) relative to the total charge formulation amount. If the rosin (b) is 30% by mass or more, and, the phenol (c) is 50% by mass or less and the formaldehyde (d) is 20% by mass or less, it becomes difficult for the synthetic resin to gel and the reaction is easier to control. If the rosin (b) is 85% by mass or less, and, the phenol (c) is 5% by mass or more, and the formaldehyde (d) is 3% by mass or more, the viscosity and the elasticity necessary for an ink can be easily obtained. Further, the raw materials are preferably 35 to 75% by mass of the rosin (b), 7 to 45% by mass of the phenol (c) and 4 to 17% by mass of the formaldehyde (d). By blending the raw materials to be within the range, a better effect is likely to be expressed.

In one embodiment, the rosin-modified phenol resin (A) may be the reaction product of a rosin (b), a resol-type phenolic resin (Rc) and a polyol (e).

The resol-type phenolic resin (Rc) can be obtained by a conventional method. As an example, the resol-type phenolic resin (Rc) can be obtained by a synthesis method in which a phenol and a formaldehyde are charged, a volatile organic solvent (xylene and the like) is added and a condensation reaction is performed in the presence of a metal oxide catalyst, a metal hydroxide catalyst or an alkaline catalyst. The ratio of phenol to formaldehyde (phenol:formaldehyde), generally by molar ratio, is preferably 1:1 to 1:3, and more preferably 1:1.5 to 1:2.5.

The resol-type phenolic resin (Rc) may be various well-known condensates obtained by adding and condensing a phenol and formaldehyde in the presence of a metal hydroxide catalyst such as sodium hydroxide, potassium hydroxide, calcium hydroxide or lithium hydroxide, or in the presence of an alkaline catalyst such as an organic amine under normal pressure or reduced pressure. The resol-type phenolic resin obtained as described above may be neutralized with sulfuric acid and the like, washed with water, and used in the reaction with the rosin (b).

All aromatic compounds having a phenolic hydroxyl group may be used as the phenols. For example, the aromatic compound may be the same as the phenol (c) exemplified above. As specific examples, carbolic acid, cresol, p-amylphenol, bisphenol A, p-butylphenol, p-octylphenol, p-nonylphenol, p-dodecylphenol and like can be provided. These phenols may be used alone or two or more may be combined.

The formaldehydes may be the same as the formaldehyde (d) exemplified above. For example, formaldehyde, paraformaldehyde and the like may be provided.

In one embodiment, the resol-type phenolic resin (Rc) obtained by the synthesis method preferably has a hydroxyl value of 15 to 40 mgKOH/g. When a resin (Rc) having a hydrocyl value in this range is used, it is possible to adjust the hydrophilic groups of the rosin-modified phenol resin (A) to an appropriate range and suppress the excessive uptake of water during printing, and thus, blanket residue can be easily decreased. The hydroxyl value is measured in accordance with the neutralization titration method.

The resol-type phenolic resin may have a hydroxyl value within the range and may be used alone or two or more may be combined. Further, in order to obtain the resol-type phenolic resin having a hydroxyl value within the range, the reaction temperature, the time, the amount of catalyst and the like may be adjusted when synthesizing the resol-type phenolic resin.

In one embodiment, the raw materials of the rosin-modified phenol resin (A) are preferably, on a mass basis, 30 to 85% by mass of the rosin (b), 7 to 67% by mass of the resol-type phenolic resin (Rc), and 3 to 20% by mass of the polyol (e) relative to the total charge formulation amount. If the rosin (b) is 30% by mass or more, and, the resol-type phenolic resin (Rc) is 67% by mass or less, it is difficult for the synthetic resin to gel and the reaction is easier to control. When the rosin (b) is 85% by mass or less, and, the resol-type phenolic resin (Rc) is 7% by mass or more, the viscosity and the elasticity necessary in an ink can be easily obtained. Further, the raw materials are more preferably 35 to 80% by mass of the rosin (b) and 10 to 60% by mass of the resol-type phenolic resin (Rc). By blending the raw materials within the range, a better effect is likely to be expressed.

A well-known method can be used as a production method of the rosin-modified phenol resin (A). For example, a synthesis method referred to as one pot synthesis can generally be used.

The following production method is provided as one embodiment of the production method by one pot synthesis.

First, the rosin (b) was heated and melted at 100 to 140° C. in a synthesis reactor, the phenol (c), the formaldehyde (d), and the alkaline catalyst in accordance with need were added, and the reaction was carried out for 1 to 8 hours. Subsequently, the polyol (e) and an esterification catalyst in accordance with need were added, and an esterification reaction was carried out at 220 to 300° C. for 3 to 20 hours.

The alkaline catalyst may be used in the presence of a metal salt catalyst such as sodium hydroxide, potassium hydroxide, calcium hydroxide, lithium hydroxide, calcium oxide, magnesium oxide, and zinc oxide, or, in the presence of an alkaline catalyst such as an organic amine. These catalysts are generally used in the range of 0.01 to 5% by mass based on all the components of the resin. These alkaline catalysts may be used alone, or a combination of two or more may be used together.

Examples of the esterification catalyst include organic sulfonic acids such as benzenesulfonic acid, p-toluenesulfonic acid, p-dodecylbenzenesulfonic acid, methanesulfonic acid, and ethanesulfonic acid, mineral acids such as sulfuric acid and hydrochloric acid, trifluoromethylsulfuric acid and trifluoromethylacetic acid and the like.

Furthermore, it is also possible to use metal complexes such as tetrabutyl zirconate and tetraisobutyl titanate, and metal salt catalysts such as magnesium oxide, magnesium hydroxide, magnesium acetate, calcium oxide, calcium hydroxide, calcium acetate, zinc oxide, and zinc acetate.

These catalysts are generally used in the range of 0.01 to 5% by mass in all resins. In order to suppress the resin coloration that occurs due to the use of a catalyst, hypophosphoric acid, triphenyl phosphite, triphenyl phosphate, triphenylphosphine or the like may also be used in combination.

Further, the following production method can be provided as another embodiment using one pot synthesis.

First, the rosin (b) was heated and melted at 100 to 140° C. in a synthesis reactor, a phenol (c), a formaldehyde (d), a polyol (e) and an alkaline catalyst were added in accordance with need, and the reaction was carried out for 0 to 8 hours. Subsequently, an esterification catalyst was added in accordance with need, and an esterification reaction was carried out at 220 to 300° C. for 3 to 20 hours. The alkaline catalyst and the esterification catalyst may be as exemplified previously.

The one pot synthesis method can reduce the initial investment in the pot, and further, since the amount of wastewater generated is small, the production cost can be suppressed.

The weight average molecular weight (Mw) and the number average molecular weight (Mn) of the rosin-modified phenol resin (A) obtained by the production method can be determined by gel permeation chromatography (GPC) (polystyrene conversion, solvent: tetrahydrofuran).

In one embodiment, the Mw/Mn which illustrates the ratio of the weight average molecular weight and the number average molecular weight of the rosin-modified phenol resin (A) may be 10 to 60. The Mw/Mn is preferably 15 to 55.

When the Mw/Mn is in the range of 10 to 60, the ink fluidity becomes good, and, the blanket residue can decrease. On the other hand, when the Mw/Mn is less than 10, the ink fluidity is insufficient, and when the Mw/Mn is in excess of 60, the blanket residue is significantly likely to occur.

Further, the weight average molecular weight of the rosin-modified phenol resin (A) may be 4,000 or more to 120,000 or less. In one embodiment, the weight average molecular weight is preferably 4,000 to 110,000, and more preferably 5,000 to 100,000. When the weight average molecular weight is 4,000 or more, the viscoelasticity of the ink is suitable, and the occurrence of scumming and blanket residue can be easily suppressed during printing. When the weight average molecular weight is 120,000 or less, a suitable gloss can be easily obtained on the printed material.

In one embodiment, the acid value of the rosin-modified phenol resin (A) is preferably 5 to 50 mgKOH/g and more preferably 7 to 40 mgKOH/g. By the acid value being within the range, the emulsification suitability is suitable when preparing the ink, and the occurrence of scumming can be suppressed. Note that, the acid value is a value measured by the neutralization titration method.

As other embodiments of the production method of the rosin-modified phenol resin (A), the rosin (b) was heated and melted at 120 to 200° C. in a synthesis reactor, the resol-type phenolic resin (Rc) was added, and the reaction was carried out for 1 to 10 hours. Subsequently, the method in which the polyol (e) and a catalyst in accordance with need were added, and an esterification reaction was carried out at 200 to 300° C. for 5 to 30 hours, and the method in which the rosin (b) was heated and melted at 120 to 200° C., the polyol (e) and a catalyst in accordance with need were added, and an esterification reaction was carried out at 200 to 300° C. for 1 to 20 hours, and then, the resol-type phenolic resin (Rc) was added at 180 to 280° C. and reacted at 200 to 300° C. for 1 to 20 hours can be provided.

Examples of the catalyst include organic sulfonic acids such as benzenesulfonic acid, p-toluenesulfonic acid, p-dodecylbenzenesulfonic acid, methanesulfonic acid, and ethanesulfonic acid, mineral acids such as sulfuric acid, and hydrochloric acid, trifluoromethyl sulfuric acid, trifluoromethylacetic acid and the like. Furthermore, metal complexes such as tetrabutyl zirconate and tetraisobutyl titanate, and metal salt catalysts such as magnesium oxide, magnesium hydroxide, magnesium acetate, calcium oxide, calcium hydroxide, calcium acetate, zinc oxide, and zinc acetate may also be used.

These catalysts are generally used in the range of 0.01 to 5% by mass based on all the components of the resin. In order to suppress the resin coloration that occurs due to the use of a catalyst, hypophosphoric acid, triphenyl phosphite, triphenyl phosphate, triphenylphosphine or the like may also be used in combination.

The weight average molecular weight (Mw) and the number average molecular weight (Mn) of the rosin-modified phenol resin (A) obtained by the production method can be determined by gel permeation chromatography (GPC) (polystyrene conversion, solvent: tetrahydrofuran). The Mw/Mn which illustrates the ratio of the weight average molecular weight and the number average molecular weight may be 10 to 60. The Mw/Mn is preferably 15 to 55.

When the Mw/Mn is in the range of 10 to 60, the ink fluidity is good, and, the blanket residue can be decreased. On the other hand, when the Mw/Mn is less than 10, the ink fluidity is not suitable, and when the Mw/Mn is in excess of 60, significant blanket residue occurs.

The weight average molecular weight of the rosin-modified phenol resin (A) is preferably 7,000 to 120,000, more preferably 10,000 to 110,000, and particularly preferably 15,000 to 80,000. When the weight average molecular weight of the rosin-modified phenol resin (A) is 7,000 or more, the viscoelasticity of the ink is suitable, and the occurrence of scumming and the blanket residue during printing can be suppressed. When the weight average molecular weight of the rosin-modified phenol resin (A) is 120,000 or less, the gloss of the printed material is suitable.

The acid value of the rosin-modified phenol resin (A) is preferably 5 to 50 mgKOH/g and more preferably 7 to 40 mgKOH/g. By the acid value being within the range, the emulsification suitability is suitable when preparing the ink, and the occurrence of scumming can be suppressed. Note that, the acid value is a value measured by the neutralization titration method.

<Varnish for Lithographic Printing Ink>

A varnish for the lithographic printing ink which is one embodiment of the present invention can be produced by adding, heating and dissolving vegetable oils, a petroleum-based solvent for ink, a gelling agent, and the like to the rosin-modified phenol resin (A) of the embodiment in accordance with need.

The vegetable oils which can be used in the varnish for lithographic printing ink may be the various well-known types, and can be used without specific limitations. Specifically, examples of the vegetable oils include linseed oil, tung oil, soybean oil, safflower oil, and dehydrated castor oil, and heat-polymerized oils and oxidation-polymerized oils of these vegetable oils.

Further, monoesters of the vegetable oils such as linseed oil fatty acid methyl ester, soybean oil fatty acid methyl ester, linseed oil fatty acid ethyl ester, soybean oil fatty acid ethyl ester, linseed oil fatty acid propyl ester, soybean oil fatty acid propyl ester, linseed oil fatty acid butyl ester, soybean oil fatty acid butyl ester, linseed oil fatty acid isobutyl ester, soybean oil fatty acid isobutyl ester may be provided.

These vegetable oils may be used alone or in combinations of two or more. It is also preferable to use recovered and regenerated vegetable oil as the vegetable oils. The use of recycled vegetable oil makes it possible to reduce waste and $CO_2$ emissions, and reduce the environmental burden.

The regenerated vegetable oil preferably has a water content of 0.3% by weight or less, an iodine value of 90 or more, and an acid value of 3 or less, and more preferably, an iodine value of 100 or more.

By adjusting the water content to 0.3% by weight or less, it is possible to remove impurities that affect the emulsification behavior of the ink such as salts contained in the water.

Further, by regenerating with an iodine value adjusted to 90 or more, it becomes easy to improve the drying property, namely, the oxidative polymerization property.

Furthermore, by selectively regenerating a vegetable oil having an acid value of 3 or less, it is possible to suppress excessive emulsification of the ink.

Examples of the method for regenerating the recycled vegetable oil include filtration, removal of precipitates by standing, and decolorization with activated clay or the like. However, the methods for regenerating are not limited thereto.

Conventionally known solvents for printing ink can be used as the petroleum-based solvent for lithographic printing ink used for the varnish for lithographic printing ink without particular limitation. Specific examples include No. 0 Solvent, AF Solvent No. 4, AF Solvent No. 5, AF Solvent No. 6, AF Solvent No. 7 and the like manufactured by ENEOS Corporation. These solvents may be used alone or in combinations of two or more. Specifically, an aroma-free solvent having an aromatic hydrocarbon content of 1% by weight or less is preferably used as a measure to protect the environment.

Various well-known compounds can be used as the gelling agent. For example, aluminum ocrylate, aluminum stearate, aluminum triisopropoxide, aluminum tributoxide, aluminum dipropoxide monoacetyl acetate, aluminum dibutoxide monoacetyl acetate, and aluminum triacetyl acetate and the like can be provided.

The composition ratios of the rosin-modified phenol resin (A), the vegetable oil, the petroleum solvent, and the gelling agent in the varnish for lithographic printing ink may be appropriately determined according to the application. Usually, the ratios are in the range of 5 to 60% by mass of the rosin-modified phenol resin, in the range of 0 to 80% by mass of the vegetable oil, in the range of 0 to 80% by mass of the petroleum-based solvent, and in the range of 0 to 4% by mass of the gelling agent.

In one embodiment, the varnish for lithographic printing ink can be used in combination with the rosin-modified phenol resin (A) which is one embodiment of the present invention, other rosin-modified phenol resins or a petroleum resin or the like.

Commercially available products can be appropriately used as the petroleum resin. Specific examples of the aliphatic petroleum resin include Quinton A100, Quinton B170, Quinton D100, Quinton M100, and Quinton R100 manufactured by Nippon Zeon Co., Ltd.

Examples of the aromatic petroleum resin include Neopolymer L-90, Neopolymer 120, Neopolymer 130, Neopolymer 140, Neopolymer 150, Neopolymer 170S, Neopolymer 160, Neopolymer E-100, Neopolymer E-130, Neopolymer 130S and Neopolymer S manufactured by ENEOS Corporation, Petcol LX, Petcol LX-HS, Petcol 100T, Petcol 120, Petcol 120HS, Petcol 130, Petcol 140, Petcol 140HM, Petcol 140HM5, Petcol 150 and Petcol 150AS manufactured by Tosoh Corporation.

Examples of the copolymerized petroleum resin include Quinton D100, Quinton N180, Quinton P195N, Quinton S100, Quinton S195, Quinton U185, Quinton G100B, Quinton G115, Quinton D200, Quinton E200SN and Quinton N295 manufactured by Nippon Zeon Co., Ltd., Petrotack 60, Petrotack 70, Petrotack 90, Petrotack 100, Petrotack 100V and Petrotack 90HM manufactured by Tosoh Corporation.

Examples of the DCPD-based petroleum resin include Marukaretsu M-890A and Marukaretsu M-845A manufactured by Maruzen Petrochemical Co., Ltd., Quinton 1325, Quinton 1345, Quinton 1500, Quinton 1525L, Quinton 1700 and the like manufactured by Nippon Zeon Co., Ltd.

The varnish for lithographic printing ink can be produced by various well-known methods. For example, each of the components can be produced by heating and melting at 100 to 250° C., preferably 120 to 200° C.

<Lithographic Printing Ink>

The lithographic printing ink which is one embodiment of the present invention is produced by the rosin-modified phenol resin (A) (which may be blended as the lithographic printing ink varnish of the embodiment) which is one embodiment of the present invention, a pigment, a petroleum-based solvent, and an additive.

Examples of the pigments which can be used include white pigments such as titanium oxide;

yellow pigments such as mineral furnace yellow, nables yellow, naphthol yellow S, hansa yellow G, quinoline yellow lake, permanent yellow NCG, and tartrazine lake;

orange pigments such as indanthren brilliant orange RK, pyrazolone orange, balkan orange, benzidine orange G and indanthren brilliant orange GK;

red pigments such as permanent red 4R, lionol red, pyralozone red, watching red calcium salt, lake red D, brilliant carmine 6B, eosin lake, rhodamin lake B, alizarin lake and brilliant carmine 3B;

purple pigments such as fast violet B and methyl violet lake;

blue pigments such as prussian blue. cobalt blue, alkali blue lake, victoria blue Lake, phthalocyanine blue, metal free phthalocyanine blue, partially chlorinated phthalocyanine blue, fast sky blue and indanthrene blue BC;

green pigments such as pigment green B, malachite green lake and fine series green G; and black pigments such as carbon black, acetylene black, tylan black and aniline black.

Various additives such as an anti-friction agent, an anti-blocking agent, a sliding agent and a scratch prevention agent may be blended in the lithographic printing ink of the embodiment according to the purpose. Further, a leveling agent, an antistatic agent, a surfactant, an antifoaming agent and the like may also be blended in accordance with need.

In one embodiment, an example of the composition of the lithographic printing ink preferably contains 5 to 75% by mass of the varnish for lithographic printing ink comprising the rosin-modified phenol resin (A) which is one embodiment of the present invention, 0 to 80% by mass of the vegetable oil, 0 to 80% by mass of the petroleum-based solvent, 5 to 40% by mass of the pigment, 0 to 40% by mass of the other resins, and 0 to 5% by mass of the other additives.

The other resins represent a rosin-modified phenol resin (or a rosin-modified phenol resin varnish), a petroleum resin (or a petroleum resin varnish), or an alkyd resin other than the present invention which can be generally used in the lithographic printing ink composition.

Normally, the lithographic printing ink of the embodiment can be preferably used for planographic offset printing using dampening water. However, the lithographic printing ink is not limited to such an embodiment, and the above-mentioned ink can also be suitably used in waterless planographic printing without using dampening water.

\<Printed Material\>

A printed material which is one embodiment of the present invention has a printed layer formed from the substrate and the lithographic printing ink of the embodiment. The printed material can be obtained by printing the lithographic printing ink of the embodiment on the substrate.

The substrate to which the ink is applied can use paper which can be used in lithographic printing and is not specifically limited. Specific examples of usable substrates include coated paper such as art paper, coated paper and cast coated paper, high quality paper, medium quality paper, and non-coated paper such as newspaper, and synthetic paper such as Yupo.

The printing machine for obtaining the printed material is not specifically limited may be an offset printing machine. specific examples of the printing machine include an offset rotary printing machine, a newspaper printing machine, a sheet printing machine and the like.

EXAMPLES

The present invention will be described below in further detail using examples, but the scope of the present invention is not limited by the following examples. Note that, in the present invention, unless specifically indicated, "part" indicates "parts by mass", and "%" indicates "% by mass".

The following examples and comparative examples relate to a rosin-modified phenol resin which is a reaction product of a rosin resin (b), a phenol (c), a formaldehyde (d) and a polyol (e). Various properties of the resins were measured according to the following.

(Weight Average Molecular Weight and Number Average Molecular Weight)

The weight average molecular weight and the number average molecular weight of the rosin-modified phenol resin (A) was measured by gel permeation chromatography (HLC-8320) manufactured by Tosoh Corporation.

A calibration curve was prepared using standard polystyrene samples. Tetrahydrofuran was used as the eluent and three TSKgel Super HM-M columns (manufactured by Tosoh Corporation) were used. Measurement was performed at a flow rate of 0.6 ml/minute, an injection volume of 10 μl, and a column temperature of 40° C.

(Acid Value)

The acid value of the rosin-modified phenol resin (A) was measured by a neutralization titration method. Specifically, first, 2 g of the rosin-modified phenol resin was measured and dissolved in 20 mL of a solvent prepared by mixing xylene and ethanol in a mass ratio of 2:1. Subsequently, 3 mL of a 3% by weight solution of phenolphthalein was added as an indicator to the prepared solution of the rosin-modified phenol resin, and then a neutralization titration was performed with a 0.1 mol/L ethanolic solution of potassium hydroxide. The units for the acid value are mgKOH/g.

(Quantitative Determination of Terpenes Content in Rosins)

The content of the monoterpene (a1) and the sesquiterpene (a2) in the rosin (b) was identified by each component in a mass spectrometer, and then the peak area ratio (%) per 100% of the total peak area of the rosin (b) was measured by gas chromatography. The measurement device used a gas chromatograph mass spectrometer manufactured by Agilent Technologies, Inc. The gas chromatograph section used 6890N, and the mass spectrometer used 5973N. An HP-5MS 30 m×0.25 mm id, 0.25 μm was used for the column, and a helium gas at a flow rate of 2.0 ml/min was used as the carrier gas. The detection conditions were measured by a full scan (m/z 40-500), 250° C. transfer line.

(Cyclic Diterpene Having a Conjugated Double Bond in the Rosin)

The content of the cyclic diterpene having a conjugated double bond in the rosin can be determined by the peak area ratio of the gas chromatography, each component was identified with a mass spectrometer, and then, by the peak area ratio (%) per 100% of the total peak area of the rosin (b) was measured.

The measurement device used a gas chromatograph mass spectrometer manufactured by Agilent Technologies, Inc. The gas chromatograph section used 6890N, and the mass spectrometer used 5973N. An HP-5MS 30 m×0.25 mm id, 0.25 μm was used for the column, and a helium gas at a flow rate of 2.0 ml/min was used as the carrier gas. The detection conditions were measured by a full scan (m/z 40-500), 250° C. transfer line.

\<Rosin-Modified Phenol Resin\>

Example I-1

647 parts of a gum rosin comprising 0.3% monoterpene, 0.8% sesquiterpene, and 68% cyclic diterpene having a conjugated double bond was charged in a four-necked flask equipped with a stirrer, a cooler with a water separator, and a thermometer, melted at 120° C. while flushing with nitrogen, 192 parts of para-t-butylphenol, 92 parts of paraformaldehyde (active ingredient 92%) and 3 parts of calcium hydroxide were charged and reacted at 120° C. for 4 hours. Subsequently, the temperature was raised to 255° C., 66 parts of glycerin was added while stirring, and reacted for 12 hours to obtain Resin I-1 having a weight average molecular weight of 14,200, a weight average molecular weight/number average molecular weight of 30 and an acid value of 19.

Example I-2

608 parts of a gum rosin comprising 0.4% monoterpene, 0.5% sesquiterpene and 55% cyclic diterpene having a conjugated double bond 55% was charged in a four-necked flask equipped with a stirrer, a cooler with a water separator, and a thermometer, melted at 120° C. while flushing with nitrogen, 247 parts of paraoctylphenol, 86 parts of paraformaldehyde (active ingredient 92%), 3 parts of calcium hydroxide and 1 part of zinc oxide were charged and reacted at 120° C. for 4 hours. Subsequently, the temperature was raised to 255° C., 55 parts of glycerin was added while stirring, and reacted for 13 hours to obtain Resin I-2 having a weight average molecular weight of 20,900, a weight average molecular weight/number average molecular weight of 44 and an acid value of 26.

Example I-3

666 parts of a gum rosin comprising 0.4% monoterpene, 0.9% sesquiterpene and 72% cyclic diterpene having a conjugated double bond was charged in a four-necked flask equipped with a stirrer, a cooler with a water separator, and a thermometer, melted at 120° C. while flushing with nitrogen, 80 parts of para-t-butylphenol, 110 parts of paraoctylphenol, 76 parts of paraformaldehyde (active ingredient 92%) and 3 parts of calcium hydroxide were charged and reacted at 120° C. for 4 hours. Subsequently, the temperature was raised to 257° C., 41 parts of glycerin, 23 parts of pentaerythritol and 1 part of p-toluenesulfonic acid were added while stirring, and reacted for 12 hours to obtain Resin I-3 having a weight average molecular weight of 24,600, a weight average molecular weight/number average molecular weight of 30 and an acid value of 20.

Example I-4

811 parts of a gum rosin comprising 0.3% monoterpene, 0.8% sesquiterpene and 50% cyclic diterpene having a conjugated double bond was charged in a four-necked flask equipped with a stirrer, a cooler with a water separator, and a thermometer, melted at 120° C. while flushing with nitrogen, 60 parts of para-t-butylphenol, 33 parts of paraformaldehyde (active ingredient 92%) and 4 parts of calcium hydroxide were charged and reacted at 120° C. for 4 hours. Subsequently, the temperature was raised to 265° C., 92 parts of pentaerythritol was added while stirring, and reacted for 10 hours to obtain Resin I-4 having a weight average molecular weight of 7,600, a weight average molecular weight/number average molecular weight of 22 and an acid value of 52.

Example I-5

520 parts of a gum rosin comprising 0.4% monoterpene, 1.0% sesquiterpene and 83% cyclic diterpene having a conjugated double bond was charged in a four-necked flask equipped with a stirrer, a cooler with a water separator, and a thermometer, melted at 120° C. while flushing with nitrogen, 284 parts of para-t-butylphenol, 154 parts of paraformaldehyde (active ingredient 92%) and 5 parts of calcium hydroxide were charged and reacted at 120° C. at 5 hours. Subsequently, the temperature was raised to 260° C., 37 parts of glycerin was added while stirring, and reacted for 11 hours to obtain Resin I-5 having a weight average molecular weight of 34,600, a weight average molecular weight/number average molecular weight of 42 and an acid value of 36.

Example I-6

332 parts of a gum rosin comprising 1.0% monoterpene, 1.4% sesquiterpene and 60% cyclic diterpene having a conjugated double bond was charged in a four-necked flask equipped with a stirrer, a cooler with a water separator, and a thermometer, melted at 120° C. while flushing with nitrogen, 453 parts of para-t-butylphenol, 177 parts of paraformaldehyde (active ingredient 92%) and 8 parts of calcium hydroxide were charged and reacted at 120° C. for 3 hours. Subsequently, the temperature was raised to 250° C., 30 parts of glycerin was added while stirring, and reacted for 12 hours to obtain Resin I-6 having a weight average molecular weight of 54,200, a weight average molecular weight/number average molecular weight of 56 and an acid value of 26.

Example I-7

527 parts of a gum rosin comprising 1.2% monoterpene, 2.0% sesquiterpene and 44% cyclic diterpene having a conjugated double bond was charged in a four-necked flask equipped with a stirrer, a cooler with a water separator, and a thermometer, melted at 120° C. while flushing with nitrogen, 314 parts of paraoctylphenol, 109 parts of paraformaldehyde (active ingredient 92%), 3 parts of calcium hydroxide and 2 parts of zinc oxide were charged and reacted at 120° C. for 5 hours. Subsequently, the temperature was raised to 255° C., 45 parts of glycerin was added while stirring, and reacted for 11 hours to obtain Resin I-7 having a weight average molecular weight of 28,900, a weight average molecular weight/number average molecular weight of 33 and an acid value 32.

Example I-8

763 parts of a gum rosin comprising 0.9% monoterpene, 1.8% sesquiterpene and 56% cyclic diterpene having a conjugated double bond was charged in a four-necked flask equipped with a stirrer, a cooler with a water separator, and a thermometer, melted at 120° C. while flushing with nitrogen, 116 parts of para-t-butylphenol, 56 parts of paraformaldehyde (active ingredient 92%) and 2 parts of calcium hydroxide were charged and reacted at 120° C. for 4 hours. Subsequently, the temperature was raised to 255° C., 46 parts of glycerin and 17 parts of pentaerythritol were added while stirring, and reacted for 12 hours to obtain Resin I-8 having a weight average molecular weight of 3,800, a weight average molecular weight/number average molecular weight of 16 and an acid value of 42.

Example I-9

558 parts of a gum rosin comprising 0.8% monoterpene, 0.9% sesquiterpene and 72% cyclic diterpene having a conjugated double bond 72% was charged in a four-necked flask equipped with a stirrer, a cooler with a water separator, and a thermometer, melted at 120° C. while flushing with nitrogen, 110 parts of para-t-butylphenol, 152 parts of paraoctylphenol, 120 parts of paraformaldehyde (active ingredient 92%) and 1 part of zinc oxide were charged and reacted for 120° C. and 6 hours. Subsequently, the temperature was raised to 250° C., 45 parts of glycerin, 13 parts of pentaerythritol and 1 part of p-toluenesulfonic acid were added while stirring, and reacted for 15 hours to obtain Resin I-9 having a weight average molecular weight of 127,200, a weight average molecular weight/number average molecular weight of 59 and an acid value 17.

Example I-10

602 parts of a gum rosin comprising 0.4% monoterpene, 1.0% sesquiterpene and 77% cyclic diterpene having a conjugated double bond was charged in a four-necked flask equipped with a stirrer, a cooler with a water separator, and a thermometer, melted at 120° C. while flushing with nitrogen, 100 parts of para-t-butylphenol, 137 parts of paraoctylphenol, 95 parts of paraformaldehyde (active ingredient 92%), 49 parts of glycerin, 14 parts of pentaerythritol and 3 parts of calcium oxide were charged and reacted at 120° C. for 2 hours. Subsequently, the temperature was raised to 260° C., and reacted for 12 hours to obtain Resin I-10 having a weight average molecular weight of 24,600, a weight average molecular weight/number average molecular weight of 42 and an acid value of 21.

Example I-11

654 parts of a gum rosin comprising 1.0% monoterpene, 1.2% sesquiterpene and 46% cyclic diterpene having a conjugated double bond was charged in a four-necked flask equipped with a stirrer, a cooler with a water separator, and a thermometer, melted at 120° C. while flushing with nitrogen, 187 parts of para-t-butylphenol, 102 parts of paraformaldehyde (active ingredient 92%), 47 parts of glycerin, 7 parts of pentaerythritol and 3 parts of zinc oxide were charged and reacted at 120° C. for 4 hours. Subsequently, the temperature was raised to 257° C., and reacted for 12 hours to obtain Resin I-11 having a weight average molecular weight of 36,200, a weight average molecular weight/number average molecular weight of 50 and an acid value of 30.

Comparative Example I-A 624 parts of a gum rosin comprising 66% cyclic diterpene having a conjugated double bond and without a monoterpene or a sesquiterpene was charged in a four-necked flask equipped with a stirrer, a cooler with a water separator, and a thermometer, melted at 120° C. while flushing with nitrogen, 214 parts of para-t-butylphenol, 102 parts of paraformaldehyde (active ingredient 92%), 1 part of calcium hydroxide and 2 parts of zinc oxide were charged and reacted at 120° C. for 4 hours. Subsequently, the temperature was raised to 255° C., 57 parts of glycerin was added while stirring, and reacted for 10 hours to obtain Resin I-A having a weight average molecular weight of 12,200, a weight average molecular weight/number average molecular weight of 18 and an acid value of 28.

Comparative Example I-B 550 parts of a gum rosin comprising 1.0% monoterpene, 1.1% sesquiterpene and 52% cyclic diterpene having a conjugated double bond was charged in a four-necked flask equipped with a stirrer, a cooler with a water separator, and a thermometer, melted at 120° C. while flushing with nitrogen, 316 parts of para-t-butylphenol, 90 parts of paraformaldehyde (active ingredient 92%) and 4 parts of calcium hydroxide were charged and reacted at 120° C. for 2 hours. Subsequently, the temperature was raised to 255° C., 39 parts of glycerin and 1 part of p-toluenesulfonic acid were added while stirring, and reacted for 9 hours to obtain Resin I-B having a weight average molecular weight of 7,700, a weight average molecular weight/number average molecular weight of 9 and an acid value of 36.

Comparative Example I-C 487 parts of a gum rosin comprising 1.2% monoterpene, 2.5% sesquiterpene and 48% cyclic diterpene having a conjugated double bond was charged in a four-necked flask equipped with a stirrer, a cooler with a water separator, and a thermometer, melted at 120° C. while flushing with nitrogen, 340 parts of paraoctylphenol, 119 parts of paraformaldehyde (active ingredient 92%) and 3 parts of zinc oxide were charged and reacted at 120° C. for 4 hours. Subsequently, the temperature was raised to 255° C., 35 parts of glycerin and 16 parts of pentaerythritol were added while stirring, and reacted for 14 hours to obtain Resin I-C having a weight average molecular weight of 77,200, a weight average molecular weight/number average molecular weight of 56 and an acid value 16.

Comparative Example I-D 537 parts of a gum rosin comprising 0.4% monoterpene, 1.0% sesquiterpene and 34% cyclic diterpene having a conjugated double bond was charged in a four-necked flask equipped with a stirrer, a cooler with a water separator, and a thermometer, melted at 120° C. while flushing with nitrogen, 66 parts of para-t-butylphenol, 212 parts of paraoctylphenol, 120 parts of paraformaldehyde (active ingredient 92%) and 4 parts of calcium hydroxide were charged and reacted at 120° C. for 6 hours. Subsequently, the temperature was raised to 250° C., 60 parts of glycerin and 1 part of p-toluenesulfonic acid were added while stirring, and reacted for 15 hours to obtain Resin I-D having a weight average molecular weight of 106,200, a weight average molecular weight/number average molecular weight of 62, and an acid value of 14.

The blend formulation and the physical properties of the resin of Resins I-1 and I-11 of the examples and Resins I-A to I-D of the comparative examples are illustrated in Table I-1.

TABLE I-1

| | | | Examples of resin synthesis | | | | | | | |
|---|---|---|---|---|---|---|---|---|---|---|
| | | | Resin I-1 | Resin I-2 | Resin I-3 | Resin I-4 | Resin I-5 | Resin I-6 | Resin I-7 | Resin I-8 |
| Formulation amount | (b) | Rosin | 64.7 | 60.8 | 66.6 | 81.1 | 52.0 | 33.2 | 52.7 | 76.3 |
| | (c) | para-t-butylphenol | 19.2 | — | 8.0 | 6.0 | 28.4 | 45.3 | — | 11.6 |
| | | Paraocrylphenol | — | 24.7 | 11.0 | — | — | — | 31.4 | — |
| | (d) | Paraformaldehyde | 9.2 | 8.6 | 7.6 | 3.3 | 15.4 | 11.7 | 10.9 | 5.8 |
| | (d) | Glycerin | 6.6 | 5.5 | 4.1 | — | 3.7 | 3.0 | 4.5 | 4.6 |
| | | Pentaerythritol | — | — | 2.3 | 9.2 | — | — | — | 1.7 |
| | Alkaline catalyst | Calcium hydroxide | 0.3 | 0.3 | 0.3 | 0.4 | 0.5 | 0.8 | 0.3 | 0.2 |
| | | Zinc oxide | — | 0.1 | — | — | — | — | 0.2 | — |
| | Esterification catalyst | p-toluenesulformic acid | — | — | 0.1 | — | — | — | — | — |
| | | Total | 100.0 | 100.0 | 100.0 | 100.0 | 100.0 | 100.0 | 100.0 | 100.0 |
| Monoterpene (a1) content (%) in resin (b) | | | 0.1 | 0.4 | 0.4 | 0.3 | 0.4 | 1.0 | 1.2 | 0.9 |
| Sesquiterpene (a2) content (%) in resin (b) | | | 0.8 | 0.5 | 0.9 | 0.8 | 1.0 | 1.4 | 2.0 | 1.8 |
| Sum of contents of (a1) and (a2) in resin (b) | | | 1.1 | 0.9 | 1.3 | 1.1 | 1.4 | 2.4 | 3.2 | 2.7 |
| Conjugated double bond content (%) in resin (b) | | | 68 | 55 | 72 | 50 | 83 | 60 | 44 | 56 |
| Properties | Weight average molecular weight (Mw) | | 14200 | 20900 | 24600 | 7600 | 34600 | 54200 | 28900 | 3800 |
| | Weight average molecular weight/number average | | 30 | 44 | 30 | 22 | 42 | 56 | 33 | 16 |
| | Acid value (mgKOH/g) | | 19 | 26 | 20 | 52 | 36 | 26 | 32 | 42 |

TABLE I-1-continued

|  |  |  | Examples of resin synthesis | | | Comparative examples of resin synthesis | | | |
|---|---|---|---|---|---|---|---|---|---|
|  |  |  | Resin I-9 | Resin I-10 | Resin I-11 | Resin I-A | Resin I-B | Resin I-C | Resin I-D |
| Formulation amount | (b) | Rosin | 55.8 | 60.2 | 65.4 | 62.4 | 55.0 | 48.3 | 53.7 |
|  | (c) | para-t-butylphenol | 11.0 | 10.0 | 18.7 | 21.4 | — | — | 6.6 |
|  |  | Paraocrylphenol | 15.2 | 13.7 | — | — | 31.6 | 34.0 | 21.2 |
|  | (d) | Paraformaldehyde | 12.0 | 9.5 | 10.2 | 10.2 | 9.0 | 11.9 | 12.0 |
|  | (d) | Glycerin | 4.5 | 4.9 | 4.7 | 5.7 | 1.9 | 1.5 | 6.0 |
|  |  | Pentaerythritol | 1.3 | 1.4 | 0.7 | — | — | 1.6 | — |
|  | Alkaline catalyst | Calcium hydroxide | — | 0.3 | — | 0.1 | 0.4 | — | 0.4 |
|  |  | Zinc oxide | 0.1 | — | 0.1 | 0.2 | — | 0.3 | — |
|  | Esterification catalyst | p-toluenesulformic acid | 0.1 | — | — | — | 0.1 | — | 0.1 |
|  | Total |  | 100.0 | 100.0 | 100.0 | 100.0 | 100.0 | 100.0 | 100.0 |
|  | Monoterpene (a1) content (%) in resin (b) |  | 0.8 | 0.4 | 1.0 | — | 1.0 | 1.2 | 0.4 |
|  | Sesquiterpene (a2) content (%) in resin (b) |  | 0.9 | 1.0 | 1.2 | — | 1.1 | 2.5 | 1.0 |
|  | Sum of contents of (a1) and (a2) in resin (b) |  | 1.7 | 1.4 | 2.2 | 0.0 | 2.1 | 3.2 | 1.4 |
|  | Conjugated double bond content (%) in resin (b) |  | 72 | 72 | 46 | 66 | 52 | 48 | 34 |
| Properties | Weight average molecular weight (Mw) |  | 127200 | 24600 | 36200 | 12200 | 7700 | 77200 | 106200 |
|  | Weight average molecular weight/number average |  | 59 | 42 | 50 | 18 | 9 | 56 | 62 |
|  | Acid value (mgKOH/g) |  | 17 | 21 | 30 | 28 | 36 | 16 | 14 |

Examples and Comparative Examples of the Varnish

The rosin-modified phenol resin (Resins I-1 to I-11 and Resins I-A to I-D) were charged in a four-necked flask equipped with a stirrer, a reflux cooler with water separator, and a thermometer at the blend formulations illustrated in Table I-2, heated and stirred at 190° C. for 1 hour while flushing with nitrogen gas to produce the varnishes (Varnishes I-1 to I-11 and Varnishes I-A to I-D). In Table I-2, the AF Solvent No. 7 is a petroleum-based solvent (AF Solvent No. 7 manufactured by ENEOS Corporation) and ALCH is a gelling agent (ALCH manufactured by Kawaken Fine Chemicals Co., Ltd.).

TABLE I-2

|  |  | Examples of varnish | | | | | | | | | | |
|---|---|---|---|---|---|---|---|---|---|---|---|---|
|  |  | Varnish I-1 | Varnish I-2 | Varnish I-3 | Varnish I-4 | Varnish I-5 | Varnish I-6 | Varnish I-7 | Varnish I-8 | Varnish I-9 | Varnish I-10 | Varnish I-11 |
|  |  | Rosin-modified phenol resin used | | | | | | | | | | |
|  |  | Resin I-1 | Resin I-2 | Resin I-3 | Resin I-4 | Resin I-5 | Resin I-6 | Resin I-7 | Resin I-8 | Resin I-9 | Resin I-10 | Resin I-11 |
| Formulation amount | Rosin-modified phenol resin | 42.0 | 41.5 | 41.5 | 43.5 | 41.0 | 41.0 | 42.0 | 44.0 | 39.5 | 41.5 | 41.5 |
|  | Soybean oil | 15.0 | 15.0 | 15.0 | 15.0 | 15.0 | 15.0 | 15.0 | 15.0 | 15.0 | 15.0 | 15.0 |
|  | AF Solvent No. 7 | 42.0 | 42.5 | 42.5 | 40.5 | 43.0 | 43.0 | 42.0 | 40.0 | 44.5 | 42.5 | 42.5 |
|  | ALCH | 1.0 | 1.0 | 1.0 | 1.0 | 1.0 | 1.0 | 1.0 | 1.0 | 1.0 | 1.0 | 1.0 |
|  | Total | 100.0 | 100.0 | 100.0 | 100.0 | 100.0 | 100.0 | 100.0 | 100.0 | 100.0 | 100.0 | 100.0 |

|  |  | Comparative examples of Varnish | | | |
|---|---|---|---|---|---|
|  |  | Varnish I-A | Varnish I-B | Varnish I-C | Varnish I-D |
|  |  | Rosin-modified phenol resin used | | | |
|  |  | Resin I-A | Resin I-B | Resin I-C | Resin I-D |
| Formulation amount | Rosin-modified phenol used | 42.0 | 43.5 | 40.0 | 40.0 |
|  | Soybean oil | 15.0 | 15.0 | 15.0 | 15.0 |
|  | AF Solvent No. 7 | 42.0 | 40.5 | 44.0 | 44.0 |
|  | ALCH | 1.0 | 1.0 | 1.0 | 1.0 |
|  | Total | 100.0 | 100.0 | 100.0 | 100.0 |

Examples and Comparative Examples of the Lithographic Printing Ink

The varnishes (I-1 to I-11 and I-A to I-D) obtained by the method, a carbon pigment Mitsubishi carbon MA7 (manufactured by Mitsubishi Chemical Corporation) and a petroleum-based solvent (AF Solvent No. 7 manufactured by ENEOS Corporation) were kneaded and dispersed using a triple roll mill according to an ordinary method at the blend formulations in Table I-3, to produce the inks of Examples I-1 to I-11 and Comparative examples I-A to I-D.

TABLE I-3

| | | \multicolumn{11}{c}{Examples of lithographic printing ink} |
|---|---|---|---|---|---|---|---|---|---|---|---|---|
| | | I-1 | I-2 | I-3 | I-4 | I-5 | I-6 | I-7 | I-8 | I-9 | I-10 | I-11 |
| | | \multicolumn{11}{c}{Varnish used} |
| | | Varnish I-1 | Varnish I-2 | Varnish I-3 | Varnish I-4 | Varnish I-5 | Varnish I-6 | Varnish I-7 | Varnish I-8 | Varnish I-9 | Varnish I-10 | Varnish I-11 |
| Formulation amount | Varnish | 53.0 | 53.0 | 53.0 | 53.0 | 53.0 | 53.0 | 53.0 | 53.0 | 53.0 | 53.0 | 53.0 |
| | Mitsubishi carbon MA7 | 21.0 | 21.0 | 21.0 | 21.0 | 21.0 | 21.0 | 21.0 | 21.0 | 21.0 | 21.0 | 21.0 |
| | AF Solvent No. 7 | 26.0 | 26.0 | 26.0 | 26.0 | 26.0 | 26.0 | 26.0 | 26.0 | 26.0 | 26.0 | 26.0 |
| | Total | 100.0 | 100.0 | 100.0 | 100.0 | 100.0 | 100.0 | 100.0 | 100.0 | 100.0 | 100.0 | 100.0 |

| | | Comparative examples of lithographic printing ink | | | |
|---|---|---|---|---|---|
| | | I-A | I-B | I-C | I-D |
| | | \multicolumn{4}{c}{Varnish used} |
| | | Varnish I-A | Varnish I-B | Varnish I-C | Varnish I-D |
| Formulation amount | Varnish | 53.0 | 53.0 | 53.0 | 53.0 |
| | Mitsubishi carbon MA7 | 21.0 | 21.0 | 21.0 | 21.0 |
| | AF Solvent No. 7 | 26.0 | 26.0 | 26.0 | 26.0 |
| | Total | 100.0 | 100.0 | 100.0 | 100.0 |

The gloss, the fluidity, the soiling, and the blanket residue were evaluated by the following methods for the lithographic printing ink obtained by the examples and the comparative examples. The evaluation results are illustrated in Table I-4.

<Evaluation of Gloss>

Using a proof bow exhibition color machine, the ink was displayed at the same concentration on a pearl coat manufactured by Mitsubishi Paper Mills Ltd., the gloss was measured by a 60° gloss value using a glossmeter gloss meter model GM-26 (manufactured by Murakami Color Research Laboratory, Inc.). The higher the number, the better the gloss. An evaluation result from A to C is practically preferable.

(Evaluation Criteria)
A: 60 or more
B: 56 or more to less than 60
C: 50 or more to less than 56
D: less than 50

<Method for Measurement of Fluidity>

Ink was placed onto a metal plate with a 2.1 cc hemispherical recess, allowed to stand for 15 minutes, and then tilted at 60 degrees and the length of the ink flow after 10 minutes was measured. The evaluation was based on the following evaluation criteria. The higher the value, the smaller the compactness of the ink, and the better the fluidity. An evaluation result from A to C is practically preferable.

(Evaluation Criteria)
A: 80 mm or more
B: 70 mm or more to less than 80 mm
C: 60 mm or more to less than 70 mm
D: less than 60 mm <Blanket Residue Evaluation>

The printing test visually examined the printed material and the blanket by the general pattern and density and under the following conditions when 50,000 copies were continuously printed using an offset rotary printing machine NE0800 manufactured by Mitsubishi Heavy Industries, Ltd., and verified the state of the blanket residue. An evaluation result from A to C is practically preferable.

Note that, the "water tolerance lower limit" means the minimum dampening water supply volume at which normal printing is possible, and the "water dial" means the dial provided on the printing press for adjusting the supply volume of the dampening water.

(Conditions)
CTP plate: XP-F manufactured by Fujifilm Corporation
Paper: Pearl Coat N manufactured by Mitsubishi Paper Mills Ltd.
Dampening water: 2% aqueous solution of Aqua Unity WKK manufactured by Toyo Ink SC Holdings Co., Ltd.
Printing speed: 600 rpm
Chiller setting temperature: 25° C.
Water dial value: 2% higher than the lower limit of the water tolerance (Evaluation Criteria)
A: There was no loss of the pattern due to poor ink transfer to the printed material, and the adhesion of ink and paper powder mixture components to the blanket was small.
B: There was no loss of the pattern due to poor ink transfer to the printed material, but there was adhesion of ink and paper powder mixture components to the blanket.
C: There was some loss of the pattern due to poor ink transfer to the printed material, and there was adhesion of ink and paper powder mixture components to the blanket.

D: There was loss of the pattern due to poor ink transfer to the printed material, and there was much adhesion of ink and paper powder mixture components accumulated on the blanket.

<Soiling Evaluation>

The printed material at the time of printing 50,000 copies obtained in the blanket residue evaluation were visually observed to confirm the presence or absence of soiling.

(Evaluation Criteria)

A: No generation of soiling

B: Some disturbance in the 80% halftone dot was observed

C: Entanglement of the ink in the 80% halftone dot was observed

D: Occurrence of soiling, not worthy of market evaluation.

The evaluation result of each example is illustrated in Table I-4.

TABLE I-4

| | Examples | | | | | | | | | | |
|---|---|---|---|---|---|---|---|---|---|---|---|
| | Example I-1 | Example I-2 | Example I-3 | Example I-4 | Example I-5 | Example I-6 | Emmple I-7 | Example I-8 | Example I-9 | Example I-10 | Example I-11 |
| Gloss value | A | A | A | C | B | C | B | C | C | A | A |
| Fluidity | A | A | A | C | B | B | C | C | B | A | A |
| Blanket residue | A | A | A | B | C | B | C | C | B | A | A |
| Soiling | A | A | A | B | B | B | C | C | A | A | A |

| | Comparative example | | | |
|---|---|---|---|---|
| | Comparative example I-A | Comparative example I-B | Comparative example I-C | Comparative example I-D |
| Gloss value | D | C | B | C |
| Fluidity | D | D | D | C |
| Blanket residue | C | D | C | D |
| Soiling | C | D | D | C |

Examples I-1 to I-11 show good results compared to Comparative examples I-A to I-D. Thereamong, Examples I-1 to 1-3 had particularly good results with regards to the gloss value, the fluidity, the soiling and the blanket residue. Further, even Examples I-10 and I-11 which were produced by a different production method had particularly good results with regards to the gloss value, the fluidity, the soiling and the blanket residue.

Comparative example I-A which used a rosin which does not contain any monoterpenes or sesquiterpenes was significantly inferior in terms of the gloss value and the fluidity. Further, with regards to Comparative example I-B in which the weight average molecular weight/number average molecular weight was less than 10, the deterioration of the fluidity, the soiling and the blanket residue occurred to the level which is not suitable in practical use. Comparative example I-C in which the sum of the content of the monoterpene and the sesquiterpene was more than 3.5% was inferior with regards to the fluidity and the soiling. Furthermore, Comparative example I-D in which the esterification reaction time is long and the weight average molecular weight/number average molecular weight is 60 or more was inferior with regards to the blanket residue, and was not suitable in practical use.

The following examples and comparative examples relate to a rosin-modified phenol resin which is the reaction product of the rosin resin (b), the resol-type phenolic resin (Rc) and the polyol (e).

Various characteristics of the resins such as the weight average molecular weight were measured in the same manner as the methods previously described.

The hydroxyl value of this resol-type phenolic resin (Rc) was measured by a neutralization titration method. Specifically, first, 4 g of a xylene solution (solid content 60%) of the resol-type phenolic resin (Rc) was measured and 20 ml of pyridine was added and dissolved. 10 ml of an esterifying agent prepared by dissolving phthalic anhydride and imidazole in pyridine was added thereto, and reacted for 30 minutes while stirring at 100° C. After cooling, 2 ml of distilled water was added and stirred, and 30 ml of acetone was further added. 3 mL of a 3% by mass solution of phenolphthalein was added as an indicator thereto, and then, a neutralization titration was performed in a 0.5 mol/L ethanolic solution of potassium hydroxide. The units for the hydroxyl value are mgKOH/g.

<Rosin-Modified Phenol Resin>

Synthesis Example 1 of Resol-Type Phenolic Resin 1000 parts of paraoctylphenol, 350 parts of 92% paraformaldehyde, 5 parts of 98% calcium hydroxide and 882 parts of xylene were added in a four-necked flask equipped with a stirrer, a cooler, and a thermometer and reacted at 90° C. for 4 hours. Then, 220 parts of tap water was added, 25 parts of 98% sulfuric acid was added dropwise, neutralized and washed with water. After stirring and standing, the upper layer part was removed, a xylene solution of a resol-type phenolic resin having a 60% non-volatile content (solid content) was obtained, and this was designated as Resol solution R1. The hydroxyl value of this resol-type phenolic resin was 37.0.

Synthesis Example 2 of Resol-Type Phenolic Resin 500 parts of paraoctylphenol, 182 parts of para-t-butylphenol, 533 parts of p-nonylphenol, 395 parts of 92% paraformaldehyde, 20 parts of 98% calcium hydroxide and 1052 parts of xylene were charged in a four-necked flask equipped with a stirrer, a reflux cooler with a water separator, and a thermometer, the temperature was raised while flushing with nitrogen gas, and was reacted at 90° C. for 6 hours. 260 parts of tap water was added, 103 parts of 98% sulfuric acid was added dropwise, neutralized and washed with water. After stirring and standing, the upper layer part was removed, a xylene solution of a resol-type phenolic resin having a 60% non-volatile content (solid content) was obtained, and this was designated as Resol solution R2. The hydroxyl value of this resol-type phenolic resin was 20.9.

Synthesis Example 3 of Resol-Type Phenolic Resin 200 parts of paraoctylphenol, 583 parts of para-t-butylphenol, 475 parts of 92% paraformaldehyde, 4 parts of 98% calcium hydroxide and 813 parts of xylene were charged in a four-necked flask equipped with a stirrer, a reflux cooler with a water separator, and a thermometer, the temperature was raised while flushing with nitrogen gas, and was reacted at 90° C. for 2 hours. 203 parts of tap water was added, 21 parts of 98% sulfuric acid was added dropwise, neutralized and washed with water. After stirring and standing, the upper layer part was removed, a xylene solution of a resol-type phenolic resin having a 60% non-volatile content (solid content) was obtained, and this was designated as Resol solution R3. The hydroxyl value of this resol-type phenolic resin was 44.2.

Example II-1

585 parts of a gum rosin comprising 0.4% monoterpene, 0.7% sesquiterpene, and 56% cyclic diterpene having a conjugated double bond was charged in a four-necked flask equipped with a stirrer, a cooler with a water separator, and a thermometer, melted at 180° C. while flushing with nitrogen gas, and 360 parts of Resol solution R1 (as solid content) was dropped over 2 hours at 200° C. Subsequently, the temperature was raised to 255° C., 54 parts of glycerin and 1 part of p-toluenesulfonic acid were added while stirring, and reacted for 12 hours, to obtain Resin II-1 having a weight average molecular weight of 36,500, a weight average molecular weight/number average molecular weight of 38 and an acid value 22.

Example II-2

702 parts of a gum rosin comprising 0.8% monoterpene, 2.0% sesquiterpene, and 48% cyclic diterpene having a conjugated double bond was charged in a four-necked flask equipped with a stirrer, a cooler with a water separator, and a thermometer, melted at 180° C. while flushing with nitrogen gas, 235 parts of Resol solution R2 (as solid content) was dropped over 2 hours at 200° C. Subsequently, the temperature was raised to 255° C., 62 parts of glycerin and 1 part of p-toluenesulfonic acid were added while stirring, and reacted for 10 hours to obtain Resin II-2 having a weight average molecular weight of 21,800, a weight average molecular weight/number average molecular weight of 28 and an acid value of 18.

Example II-3

640 parts of a gum rosin comprising 0.4% monoterpene, 0.9% sesquiterpene and 82% cyclic diterpene having a conjugated double bond was charged in a four-necked flask equipped with a stirrer, a cooler with a water separator, and a thermometer, melted at 180° C. while flushing with nitrogen gas, and 301 parts of Resol solution R1 (as solid content) was dropped over 2 hours at 200° C. Subsequently, the temperature was raised to 252° C., 58 parts of glycerin, 1 part of p-toluenesulfonic acid were added while stirring, and reacted for 10 hours to obtain Resin II-3 having a weight average molecular weight of 24,600, a weight average molecular weight/number average molecular weight of 30 and an acid value of 20.

Example II-4

270 parts of a tall rosin comprising 0.1% monoterpene, 0.4% sesquiterpene and 50% cyclic diterpene having a conjugated double bond was charged in a four-necked flask equipped with a stirrer, a cooler with a water separator, and a thermometer, melted at 180° C. while flushing with nitrogen gas, and 717 parts of Resol solution R1 (as solid content) was dropped over 2 hours at 200° C. Subsequently, the temperature was raised to 255° C., 12 parts of glycerin, 1 part of p-toluenesulfonic acid were added while stirring, and reacted for 9 hours to obtain Resin II-4 having a weight average molecular weight of 38,200, a weight average molecular weight/number average molecular weight of 36 and an acid value of 53.

Example II-5

622 parts of a gum rosin comprising 0.3% monoterpene, 1.1% sesquiterpene and 36% cyclic diterpene having a conjugated double bond was charged in a four-necked flask equipped with a stirrer, a cooler with a water separator, and a thermometer, melted at 180° C. while flushing with nitrogen gas, and 280 parts of Resol solution R2 (as solid content) was dropped over 2 hours at 200° C. Subsequently, the temperature was raised to 255° C., 95 parts of glycerin and 3 parts of p-toluenesulfonic acid were added while stirring, and reacted for 12 hours to obtain Resin II-5 having a weight average molecular weight of 51,200, weight average molecular weight/number average molecular weight of 48, and an acid value of 4.

Example II-6

802 parts of a gum rosin comprising 0.4% monoterpene, 0.7% sesquiterpene and 54% cyclic diterpene having a conjugated double bond was charged in a four-necked flask equipped with a stirrer, a cooler with a water separator, and a thermometer, melted at 180° C. while flushing with nitrogen gas, and 120 parts of Resol solution R2 (as solid content) was dropped over 1.5 hours at 200° C. Subsequently, the temperature was raised to 260° C., 76 parts of pentaerythritol and 2 parts of p-toluenesulfonic acid were added while stirring, and reacted for 9 hours to obtain Resin II-6 having a weight average molecular weight of 4,700, a weight average molecular weight/number average molecular weight of 12 and an acid value of 10.

Example II-7

565 parts of a gum rosin comprising 0.8% monoterpene, 1.9% sesquiterpene, and 44% cyclic diterpene having a conjugated double bond was charged in a four-necked flask equipped with a stirrer, a cooler with a water separator, and a thermometer, melted at 180° C. while flushing with nitrogen gas, and 376 parts of Resol solution R1 (as solid content) was dropped over 2.5 hours at 200° C. Subsequently, the temperature was raised to 255° C., 45 parts of glycerin, 13 parts of pentaerythritol and 1 part of calcium oxide were added while stirring, and reacted for 11 hours to obtain Resin II-7 having a weight average molecular weight of 14,200, a weight average molecular weight/number average molecular weight of 18 and an acid value of 21.

Example II-8

577 parts of a gum rosin comprising 0.8% monoterpene, 1.9% sesquiterpene and 44% cyclic diterpene having a conjugated double bond 44% was charged in a four-necked flask equipped with a stirrer, a cooler with a water separator, and a thermometer, melted at 180° C. while flushing with nitrogen gas, and 369 parts of Resol solution R1 (as solid content) was dropped over 2.5 hours at 200° C. Subsequently, the temperature was raised to 255° C., 47 parts of glycerin, 6 parts of pentaerythritol and 1 part of zinc oxide were added while stirring, and reacted for 12 hours to obtain Resin II-8 having a weight average molecular weight of 39,100, a weight average molecular weight/number average molecular weight of 40 and an acid value of 24.

Example II-9

431 parts of a gum rosin comprising 0.4% monoterpene, 1.0% sesquiterpene and 37% cyclic diterpene having a conjugated double bond was charged in a four-necked flask equipped with a stirrer, a cooler with a water separator, and a thermometer, melted at 180° C. while flushing with nitrogen gas, and 527 parts of Resol solution R1 (as solid content) was dropped over 3.5 hours at 200° C. Subsequently, the temperature was raised to 250° C., 41 parts of glycerin and 1 part of p-toluenesulfonic acid were added while stirring, and reacted for 16 hours to obtain Resin II-9 having a weight average molecular weight of 131,200, a weight average molecular weight/number average molecular weight of 58 and an acid value of 14.

Comparative Example II-A 624 parts of a gum rosin comprising 51% cyclic diterpene having a conjugated double bond without a monoterpene or a sesquiterpene was charged in a four-necked flask equipped with a stirrer, a cooler with a water separator, and a thermometer, melted at 180° C. while flushing with nitrogen gas, and 321 parts of Resol solution R1 (as solid content) was dropped over 2 hours at 200° C. Subsequently, the temperature was raised to 250° C., 54 parts of glycerin and 1 part of p-toluenesulfonic acid were added while stirring, and reacted for 10 hours to obtain Resin II-A having a weight average molecular weight of 9,800, a weight average molecular weight/number average molecular weight of 9 and an acid value of 28.

Comparative Example II-B 540 parts of a gum rosin comprising 1.0% monoterpene, 2.8% sesquiterpene and 44% cyclic diterpene having a conjugated double bond was charged in a four-necked flask equipped with a stirrer, a cooler with a water separator, and a thermometer, melted at 180° C. while flushing with nitrogen gas, and 409 parts of Resol solution R1 (as solid content) was dropped over 2 hours at 200° C. Subsequently, the temperature was raised to 250° C., 50 parts of glycerin and 1 part of p-toluenesulfonic acid were added while stirring, and reacted for 15 hours to obtain Resin II-B having a weight average molecular weight of 86,200, a weight average molecular weight/number average molecular weight of 58 and an acid value of 13.

Comparative Example II-C 510 parts of a gum rosin comprising 0.2% monoterpene, 1.0% sesquiterpene and 36% cyclic diterpene having a conjugated double bond was charged in a four-necked flask equipped with a stirrer, a cooler with a water separator, and a thermometer, melted at 180° C. while flushing with nitrogen gas, and 432 parts of Resol solution R1 (as solid content) was dropped over 2 hours at 200° C. Subsequently, the temperature was raised to 250° C., 46 parts of glycerin, 11 parts of pentaerythritol and 1 part of p-toluenesulfonic acid were added while stirring, and reacted for 16 hours to obtain Resin II-C having a weight average molecular weight of 108,200, a weight average molecular weight/number average molecular weight of 62 and an acid value 12.

Comparative Example II-D 600 parts of a gum rosin comprising 0.8% monoterpene, 1.4% sesquiterpene and 51% cyclic diterpene having a conjugated double bond was charged in a four-necked flask equipped with a stirrer, a cooler with a water separator, and a thermometer, melted at 180° C. while flushing with nitrogen gas, and 353 parts of Resol solution R3 (as solid content) was dropped over 2 hours at 200° C. Subsequently, the temperature was raised to 255° C., 46 parts of glycerin and 1 part of p-toluenesulfonic acid were added while stirring, and reacted for 11 hours to obtain Resin II-D having a weight average molecular weight of 22,400, a weight average molecular weight/number average molecular weight of 17 and an acid value of 25.

The blend formulation and the physical properties of the resin of Resins II-1 to II-9 of the examples and Resins II-A to II-D of the comparative examples are illustrated in Table II-1.

TABLE II-1

| | | | Examples of resin synthesis | | | | | | | | | Comparative examples of resin synthesis | | | |
|---|---|---|---|---|---|---|---|---|---|---|---|---|---|---|---|
| | | | Resin II-1 | Resin II-2 | Resin II-3 | Resin II-4 | Resin II-5 | Resin II-6 | Resin II-7 | Resin II-8 | Resin II-9 | Resin II-A | Resin II-B | Resin II-C | Resin II-D |
| Formutation amount | (b) | Rosin | 58.5 | 70.2 | 64.0 | 27.0 | 62.2 | 80.2 | 56.5 | 57.7 | 43.1 | 62.4 | 54.0 | 51.0 | 60.0 |
| | (c) | Resol solution R1 (in terms of solid content) | 36.0 | — | 30.1 | 71.7 | — | — | 37.6 | 36.9 | 52.7 | 32.1 | 40.9 | 43.2 | — |
| | | Resol solution R2 (in terms of solid content) | — | 23.5 | — | — | 28.0 | 12.0 | — | — | — | — | — | — | — |

TABLE II-1-continued

|  |  | Examples of resin synthesis | | | | | | | | | Comparative examples of resin synthesis | | | |
| --- | --- | --- | --- | --- | --- | --- | --- | --- | --- | --- | --- | --- | --- | --- |
|  |  | Resin II-1 | Resin II-2 | Resin II-3 | Resin II-4 | Resin II-5 | Resin II-6 | Resin II-7 | Resin II-8 | Resin II-9 | Resin II-A | Resin II-B | Resin II-C | Resin II-D |
|  | Resol solution R3 (in terms of solid content) | — | — | — | — | — | — | — | — | — | — | — | — | 35.3 |
| (d) | Glycerin | 5.4 | 6.2 | 5.8 | 1.2 | 9.5 | — | 4.5 | 4.7 | 4.1 | 5.4 | 5.0 | 4.6 | 4.6 |
|  | Pentaelythritol | — | — | — | — | — | 7.6 | 1.3 | 0.6 | — | — | — | 1.1 | — |
| Catalyst | p-toluenesulfonic acid | 0.1 | 0.1 | 0.1 | 0.1 | 0.3 | 0.2 | — | — | 0.1 | 0.1 | 0.1 | 0.1 | 0.1 |
|  | Calcium hydroxide | — | — | — | — | — | — | 0.1 | — | — | — | — | — | — |
|  | Zinc oxide | — | — | — | — | — | — | — | 0.1 | — | — | — | — | — |
|  | Total | 100.0 | 100.0 | 100.0 | 100.0 | 100.0 | 100.0 | 100.0 | 100.0 | 100.0 | 100.0 | 100.0 | 100.0 | 100.0 |
| Monoterpene (a1) content (%) in rosin (b) | | 0.4 | 0.8 | 0.4 | 0.1 | 0.3 | 0.4 | 0.8 | 0.8 | 0.4 | — | 1.0 | 0.2 | 0.8 |
| Sesquiterpene (a2) content (%) in rosin (b) | | 0.7 | 2.0 | 0.9 | 0.4 | 1.1 | 0.7 | 1.9 | 1.9 | 1.0 | — | 2.8 | 1.0 | 1.4 |
| Sum of contents of (a1) and (a2) in rosin (b) | | 1.1 | 2.8 | 1.3 | 0.5 | 1.4 | 1.1 | 2.7 | 2.7 | 1.4 | 0.0 | 3.8 | 1.2 | 2.2 |
| Conjugated double bond content (%) in rosin (b) | | 54 | 48 | 82 | 50 | 36 | 54 | 44 | 44 | 37 | 51 | 44 | 36 | 51 |
| Hydroxyl value (mgKOH/g) of the resol-type phenolic resin | | 37.0 | 20.9 | 37.0 | 37.0 | 20.9 | 20.9 | 37.0 | 37.0 | 37.0 | 37.0 | 37.0 | 37.0 | 44.2 |
| Properties | Weight average molecular weight (Mw) | 36500 | 21800 | 24600 | 38200 | 51200 | 4700 | 14200 | 39100 | 131200 | 9800 | 86200 | 108200 | 22400 |
|  | Weight average molecular weight/number average molecular weight (Mw/Mn) | 38 | 28 | 30 | 36 | 48 | 12 | 18 | 40 | 58 | 9 | 58 | 62 | 17 |
|  | Acid value (mgKOH/g) | 22 | 18 | 20 | 53 | 4 | 10 | 21 | 24 | 14 | 28 | 13 | 12 | 25 |

Examples and Comparative Examples of the Varnish

The rosin-modified phenol resin (Resins II-1 to II-9, and Resins II-A to II-D) was charged in a four-necked flask equipped with a stirrer, a reflux cooler with water separator, and a thermometer at the blend formulations illustrated in Table II-2, heated and stirred at 190° C. for 1 hour while flushing with nitrogen gas to produce the varnishes (Varnishes II-1 to II-9 and Varnishes II-A to II-D). The AF Solvent No. 7 in Table II-2 is a petroleum-based solvent (AF Solvent No. 7 manufactured by JXTG Nippon Oil & Energy Corporation), and ALCH is a gelling agent (ALCH manufactured by Kawaken Fine Chemicals Co., Ltd.).

TABLE II-2

|  |  | Examples of Varnish | | | | | | | | |
| --- | --- | --- | --- | --- | --- | --- | --- | --- | --- | --- |
|  |  | Varnish II-1 | Varnish II-2 | Varnish II-3 | Varnish II-4 | Varnish II-5 | Varnish II-6 | Varnish II-7 | Varnish II-8 | Varnish II-9 |
|  |  | Rosin-modified phenol resin used | | | | | | | | |
|  |  | Resin II-1 | Resin II-2 | Resin II-3 | Resin II-4 | Resin II-5 | Resin II-6 | Resin II-7 | Resin II-8 | Resin II-9 |
| Formulation amount | Rosin-modified phenol resin | 40.0 | 41.5 | 42.0 | 41.0 | 41.0 | 43.0 | 42.0 | 41.5 | 39.5 |
|  | Soybean oil | 15.0 | 15.0 | 15.0 | 15.0 | 15.0 | 15.0 | 15.0 | 15.0 | 15.0 |
|  | AF Solvent No. 7 | 44.0 | 42.5 | 42.0 | 43.0 | 43.0 | 41.0 | 42.0 | 42.5 | 44.5 |
|  | ALCH | 1.0 | 1.0 | 1.0 | 1.0 | 1.0 | 1.0 | 1.0 | 1.0 | 1.0 |
|  | Total | 100.0 | 100.0 | 100.0 | 100.0 | 100.0 | 100.0 | 100.0 | 100.0 | 100.0 |

TABLE II-2-continued

| | | Comparative examples of Varnish | | | |
|---|---|---|---|---|---|
| | | Varnish II-A | Varnish II-B | Varnish II-C | Varnish II-D |
| | | Rosin-modified phenol resin used | | | |
| | | Resin II-A | Resin II-B | Resin II-C | Resin II-D |
| Formulation amount | Rosin-modified phenol resin | 42.0 | 40.0 | 40.0 | 41.5 |
| | Soybean oil | 15.0 | 15.0 | 15.0 | 15.0 |
| | AF Solvent No. 7 | 42.0 | 44.0 | 44.0 | 42.5 |
| | ALCH | 1.0 | 1.0 | 1.0 | 1.0 |
| | Total | 100.0 | 100.0 | 100.0 | 100.0 |

Examples and Comparative Examples of Lithographic Printing Ink

The varnishes (II-1 to II-9, II-A to II-D) obtained by the method, a carbon pigment Mitsubishi carbon MA7 (manufactured by Mitsubishi Chemical Corporation), and a petroleum-based solvent (AF Solvent No. 7 manufactured by JXTG Nippon Oil & Energy Corporation) were kneaded and dispersed using a triple roll mill according to an ordinary method at the blend formulations of Table II-3 to produce the inks of Examples II-1 to II-9 and Comparative examples II-A to II-D.

TABLE II-3

| | | Examples of lithographic printing ink | | | | | | | | |
|---|---|---|---|---|---|---|---|---|---|---|
| | | II-1 | II-2 | II-3 | II-4 | II-5 | II-6 | II-7 | II-8 | II-9 |
| | | Varnish used | | | | | | | | |
| | | Varnish II-1 | Varnish II-2 | Varnish II-3 | Varnish II-4 | Varnish II-5 | Varnish II-6 | Varnish II-7 | Varnish II-8 | Varnish II-9 |
| Formulation amount | Varnish | 53.0 | 53.0 | 53.0 | 53.0 | 53.0 | 53.0 | 53.0 | 53.0 | 53.0 |
| | Mitsubishi carbon MA7 | 21.0 | 21.0 | 21.0 | 21.0 | 21.0 | 21.0 | 21.0 | 21.0 | 21.0 |
| | AF Solvent No. 7 | 26.0 | 26.0 | 26.0 | 26.0 | 26.0 | 26.0 | 26.0 | 26.0 | 26.0 |
| | Total | 100.0 | 100.0 | 100.0 | 100.0 | 100.0 | 100.0 | 100.0 | 100.0 | 100.0 |

| | | Comparative example of lithographic printing ink | | | |
|---|---|---|---|---|---|
| | | II-A | II-B | II-C | II-D |
| | | Varnish used | | | |
| | | Varnish II-A | Varnish II-B | Varnish II-C | Varnish II-D |
| Fomulation amount | Varnish | 53.0 | 53.0 | 53.0 | 53.0 |
| | Mitsubishi carbon MA7 | 21.0 | 21.0 | 21.0 | 21.0 |
| | AF Solvent No. 7 | 26.0 | 26.0 | 26.0 | 26.0 |
| | Total | 100.0 | 100.0 | 100.0 | 100.0 |

The gloss, the fluidity and the blanket residue were evaluated by the following methods for the lithographic printing ink obtained by the examples and the comparative examples. The evaluation results are illustrated in Table II-4.

<Evaluation of Gloss>

Using a proof bow exhibition color machine, the ink was displayed at the same concentration on a pearl coat manufactured by Mitsubishi Paper Mills Ltd., the gloss was measured by a 60° gloss value using a glossmeter gloss meter model GM-26 (manufactured by Murakami Color Research Laboratory, Inc.). The higher the number, the better the gloss. An evaluation result from A to C is practically preferable.

(Evaluation Criteria)
A: 60 or more
B: 56 or more to less than 60
C: 50 or more to less than 56
D: less than 50

<Method for Measurement of Fluidity>

Ink was placed onto a metal plate with a 2.1 cc hemispherical recess, allowed to stand for 15 minutes, and then tilted at 60 degrees and the length of the ink flow after 10 minutes was measured. The evaluation was based on the following evaluation criteria. The higher the value, the smaller the compactness of the ink, and the better the fluidity. An evaluation result from A to C is practically preferable.

(Evaluation Criteria)
A: 80 mm or more
B: 70 mm to less than 80 mm
C: 60 mm to less than 70 mm
D: less than 60 mm <Blanket Residue Evaluation>

The printing test visually examined the printed material and the blanket by the general pattern and density and under the following conditions when 50,000 copies were continuously printed using an offset rotary printing machine NEO800 manufactured by Mitsubishi Heavy Industries, Ltd., and verified the state of the blanket residue. An evaluation result from A to C is practically preferable.

Note that, the "water tolerance lower limit" means the minimum dampening water supply volume at which normal printing is possible, and the "water dial" means the dial provided on the printing press for adjusting the supply volume of the dampening water.

(Conditions)

CTP plate: XP-F manufactured by Fujifilm Corporation

Paper: Pearl Coat N manufactured by Mitsubishi Paper Mills Ltd.

Dampening water: 2% aqueous solution of Aqua Unity WKK manufactured by Toyo Ink SC Holdings Co., Ltd.

Printing speed: 600 rpm

Chiller setting temperature: 25° C.

Water dial value: 2% higher than the lower limit of the water tolerance (Evaluation Criteria)

A: There was no loss of the pattern due to poor ink transfer to the printed material, and the adhesion of ink and paper powder mixture components to the blanket was small.

B: There was no loss of the pattern due to poor ink transfer to the printed material, but there was adhesion of ink and paper powder mixture components to the blanket.

C: There was some loss of the pattern due to poor ink transfer to the printed material, and there was adhesion of ink and paper powder mixture components to the blanket.

D: There was loss of the pattern due to poor ink transfer to the printed material, and there was much adhesion of ink and paper powder mixture components accumulated on the blanket.

TABLE II-4

|  | Examples | | | | | | | | | Comparative examples | | | |
| --- | --- | --- | --- | --- | --- | --- | --- | --- | --- | --- | --- | --- | --- |
|  | II-1 | II-2 | II-3 | II-4 | II-5 | II-6 | II-7 | II-8 | II-9 | II-A | II-B | II-C | II-D |
| Gloss value | A | A | B | B | C | C | A | A | C | D | C | B | B |
| Fluidity | A | A | A | C | C | B | A | A | B | D | D | B | B |
| Blanket residue | A | A | A | B | B | C | A | A | A | D | B | D | D |

Examples II-1 to II-9 show good results compared to Comparative examples II-A to II-D. Thereamong, Examples II-1 and II-2, and II-7 and II-8 have particularly good results with regards to the gloss value, the fluidity and the blanket residue.

On the other hand, with regards to Comparative example II-A which used a rosin which was free of monoterpenes and sesquiterpenes, the weight average molecular weight/number average molecular weight was less than 10, and the gloss value, and the fluidity were inferior. Further, much blanket residue was deposited, which is not suitable for practical use. Comparative example II-B in which the sum of the content of the monoterpene and sesquiterpene was more than 3.5% had an inferior fluidity. Furthermore, Comparative example II-C in which the esterification reaction time was long and the weight average molecular weight/number average molecular weight is 60 or more had an inferior blanket residue. Both the fluidity and the blanket residue are at levels which are not suitable for practical use. Further, Comparative example II-D which used a resol-type phenolic resin having a hydroxyl value of 40 mgKOH/g or more has an inferior blanket residue.

The invention claimed is:

1. A rosin-modified phenol resin (A) which is a reaction product of a rosin (b), a phenol (c), a formaldehyde (d) and a polyol (e), wherein
    the rosin (b) contains 0.1 to 3.5% by mass of a monoterpene (a1) and a sesquiterpene (a2) relative to the total weight of the rosin, and
    Mw/Mn, which is the ratio of the weight average molecular weight (Mw) and the number average molecular weight (Mn), of the rosin-modified phenol resin (A) is 10 to 60.

2. The rosin-modified phenol resin (A) according to claim 1, wherein
    the rosin (b) comprises 20 to 80% by mass of a cyclic diterpene having a conjugated double bond.

3. The rosin-modified phenol resin (A) according to claim 1, wherein the weight average molecular weight of the rosin-modified phenol resin (A) is 4,000 to 120,000, and, the acid value of the rosin-modified phenol resin (A) is 5 to 50 mg KOH/g.

4. A lithographic printing ink, comprising
    the rosin-modified phenol resin (A) according to claim 1.

5. A printed material in which the lithographic printing ink according to claim 4 was printed on a substrate.

* * * * *